United States Patent [19]
Todd et al

[11] Patent Number: 5,164,254
[45] Date of Patent: Nov. 17, 1992

[54] HOODLINER

[75] Inventors: Melvin I. Todd, Old Bridge; Peter M. Doishuk, Burlington; Frank J. Flesch, Toms River, all of N.J.

[73] Assignee: Chicopee, New Brunswick, N.J.

[21] Appl. No.: 641,216

[22] Filed: Jan. 15, 1991

[51] Int. Cl.⁵ .................. B32B 27/04; B32B 27/08; B32B 35/00; B62D 25/00
[52] U.S. Cl. ...................... 428/290; 156/83; 156/198; 156/213; 156/220; 156/244.11; 156/286; 156/308.2; 156/308.4; 156/309.9; 296/39.3; 296/211; 296/901; 428/74; 428/172; 428/332; 428/334; 428/337; 428/340; 428/913
[58] Field of Search ......... 296/39.3, 211, 901; 428/74, 172, 290, 913, 332, 334, 337, 340; 156/83, 198, 213, 220, 244.11, 286, 308.2, 308.4, 309.9

[56] References Cited

U.S. PATENT DOCUMENTS

| | | | |
|---|---|---|---|
| 4,379,802 | 4/1983 | Weaver et al. | 428/220 |
| 4,478,660 | 10/1984 | Landler et al. | 296/211 |
| 4,522,673 | 6/1985 | Fell et al. | 428/252 |
| 4,716,072 | 12/1987 | Kim | 428/286 |
| 4,751,134 | 6/1988 | Chenoweth et al. | 428/280 |
| 4,824,507 | 4/1989 | D'Amico | 428/74 |
| 4,851,274 | 7/1989 | D'Elia | 428/290 |

FOREIGN PATENT DOCUMENTS

| | | | |
|---|---|---|---|
| 3313001 | 10/1984 | Fed. Rep. of Germany | 296/39.3 |
| 3601204 | 7/1987 | Fed. Rep. of Germany | 296/39.3 |
| 48007 | 7/1980 | Japan | 296/39.3 |
| 41229 | 3/1982 | Japan | 296/39.3 |
| 2096048 | 10/1982 | United Kingdom | |

Primary Examiner—James C. Cannon

[57] ABSTRACT

A composite material is provided for use in a vacuum thermoforming process, which material is easily handled and presents an aesthetically pleasing fabric-like surface. The composite material comprises an outer layer of nonwoven fabric comprising thermoplastic fibers capable of elongation upon the application of heat and tensile force so as to be readily conformable to shaping in the vacuum thermoforming process. The composite material further comprises an inner layer of thermoplastic film.

25 Claims, 5 Drawing Sheets

HOODLINER

BACKGROUND OF THE INVENTION

This invention relates to the field of vacuum thermoforming and in particular relates to materials and processes for providing a finished product having a fabric-like surface as well as the thermoformed articles employing such materials.

Vacuum thermoforming has perhaps found its greatest application in the field of packaging wherein items have been protected by closely fitting packaging which conforms to the shape of even irregular items. In some such processes, often referred to as "skin packaging", the item is placed on a cardboard backing. A thermoplastic material such as a film of polyester, polyvinylidene chloride, Polyvinyl chloride, polyvinyl acetate, polyethylene or polypropylene is laid over the item and is heated and then drawn down onto the item using vacuum. The film, owing to its thermal plasticity, will conform to the shape of the item and, in the plastic state, will adhere to the cardboard backing and remain so adhered after cooling, thus encapsulating the item between the film and the backing. In the so-called "blister packaging" application, the film is heated and vacuum formed by being drawn into a mold designed to produce a film shaped to accommodate the item to be packaged. The item is then placed into the so-shaped film, often while still in the mold, and a cardboard backing is then adhered to encapsulate the item.

It has been discovered that a particularly useful application of vacuum thermoforming is in the field of liners such as hoodliners, trunkliners, and roof liners (i.e., headliners) for inner surfaces of vehicles. These liners comprise a relatively thick body of noise and/or heat insulating material such as, for example, fiberglass. The body is molded to fit the contours of the inner surface of automobile hoods, trunks and roofs and as such, the body comprises an irregular shape whose surfaces are interrupted by protrusions and depressions.

While the fiberglass body provides excellent insulation properties, both for aesthetic and practical purposes, the nature of this material presents drawbacks. Firstly, the fiberglass insulation tends to be brittle, causing breaking of fiber and formation of particles which are disadvantageous both during the liner installation process and in use. Secondly, the surface tends to be rough and aesthetically displeasing.

Accordingly, there have been several suggestions for applying to this insulation surface a material which Protects against such breakage and is more aesthetically Pleasing. Such suggestions are to be found, for example, in A. Marzocchi et al. U.S. Pat. No. 3,263,530 wherein a fiberglass headliner is provided with a laminate cover comprising layers of thermoplastic film sandwiching a glass fiber cloth and adhered by means of heat and compression. Further, in U.S. Pat. No. 4,002,367 there is described a nonwoven cover adhered to the fiberglass body of a liner by employing an adhesive. Further still in Harmes U.S. Pat. No. 3,620,906 wherein a polyethylene layer and a fiber layer are laminated to the fiberglass body.

While each of these suggestions have to an extent, improved the installation and use problems associated with the fiberglass insulation liners, they each suffer from drawbacks. In some instances the prior suggestions result in a plastic like outer surface which is visible in the finished vehicle and aesthetically displeasing. In other instances, the prior suggestions result in a requirement for the installer to handle several different layers of material and, in certain circumstances, handle relatively weak, easily torn, easily creased, nonwoven materials.

Accordingly, there is a need for a material which can be combined with an insulating body such as a fiberglass body, which can have an irregular surface, which can be handled and installed without extraordinary Care, and which will present an aesthetically pleasing surface.

SUMMARY OF THE INVENTION

A composite material is provided for use in a vacuum thermoforming process, which material is easily handled and presents an aesthetically pleasing fabric-like surface. The composite material comprises an outer layer of nonwoven fabric comprising thermoplastic fibers capable of elongation upon the application of heat and tensile force so as to be readily conformable to shaping in the vacuum thermoforming process. The composite material further comprises an inner layer of thermoplastic film.

In accordance with the teachings herein, at the interface between the layers, the film impregnates into the fabric to a degree such that the combined thickness of the nonimpregnating portion of the film and the impregnated portion of the fabric is greater than the thickness of the portion of the fabric not impregnated with said film.

It has been discovered that when this composite material is provided in a vacuum thermoforming process wherein a vacuum is drawn on the inner layer's surface (i.e., a lower pressure is induced on the surface of the inner layer then on the surface of the outer layer) while said material is in the heated state, the impregnating portion of the film will be drawn away from the outer surface of the outer layer, thus exposing fiber in the area of the outer surface and providing a more fabric-like appearance. Accordingly, by employing the composite material of this invention in a vacuum forming process, such material will have the benefit of the convenience of handling a material which behaves essentially as an all plastic film material. After thermoforming, such material will exhibit the aesthetic properties of a fabric.

BRIEF DESCRIPTION OF THE DRAWINGS

The invention will be described in more detail in the following description, taken together with reference to the accompanying drawings wherein.

DETAILED DESCRIPTION OF THE INVENTION

Figure 1:
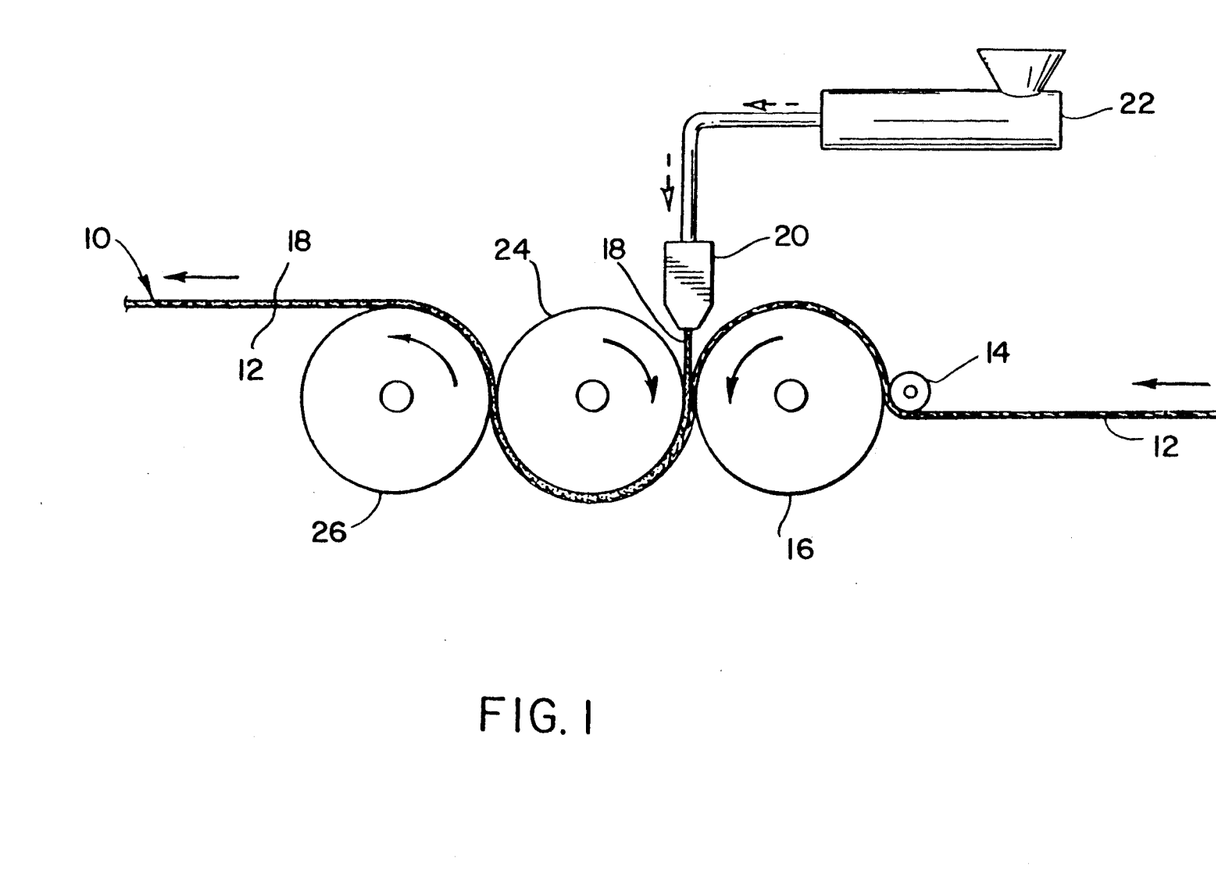
FIG. 1 is a schematic front elevational view of a manufacturing line for manufacturing an embodiment of the composite material of this invention employing the processes taught herein.
Figure 2:
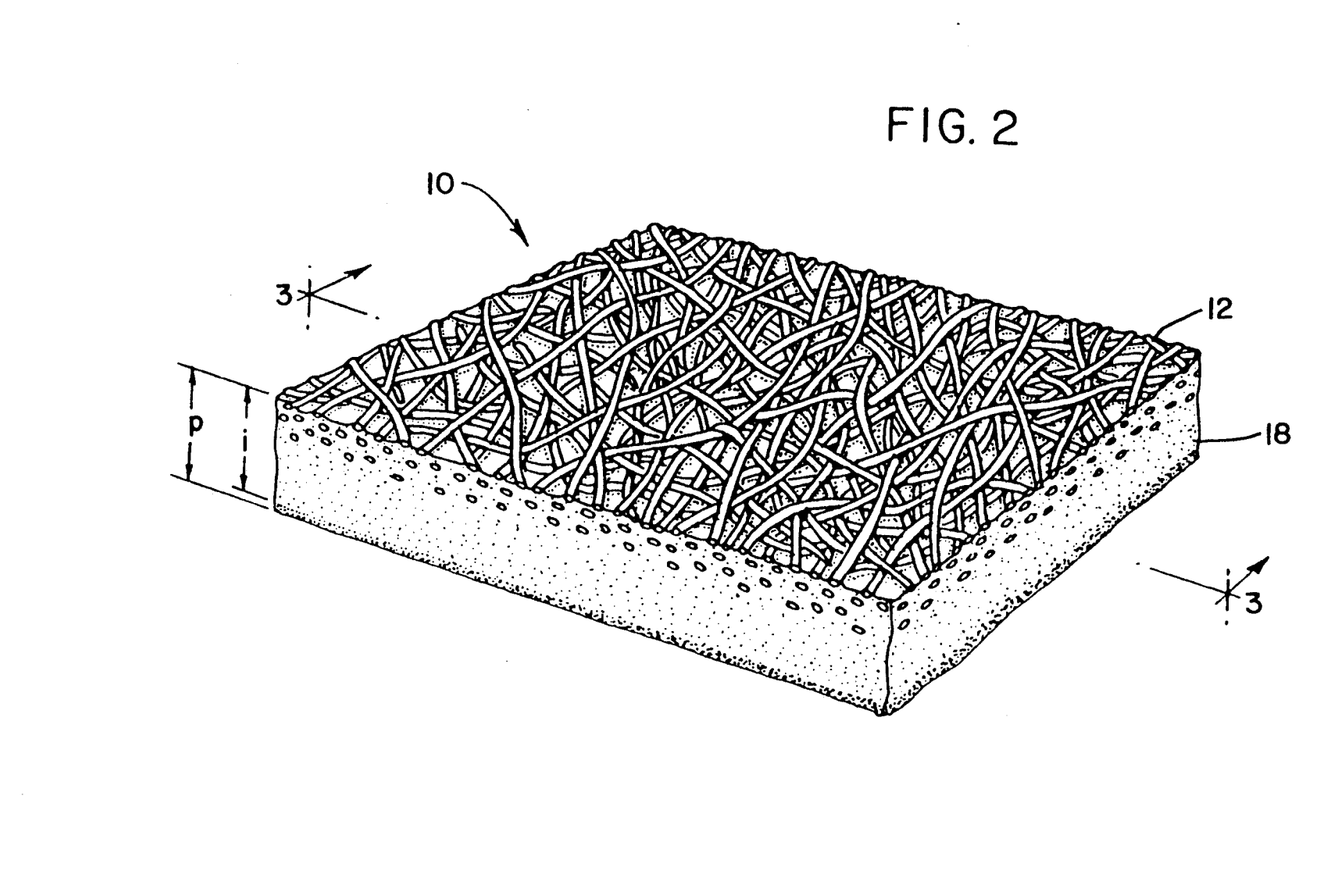
FIG. 2 is a perspective view of an embodiment of the composite material of this invention.
Figure 3:
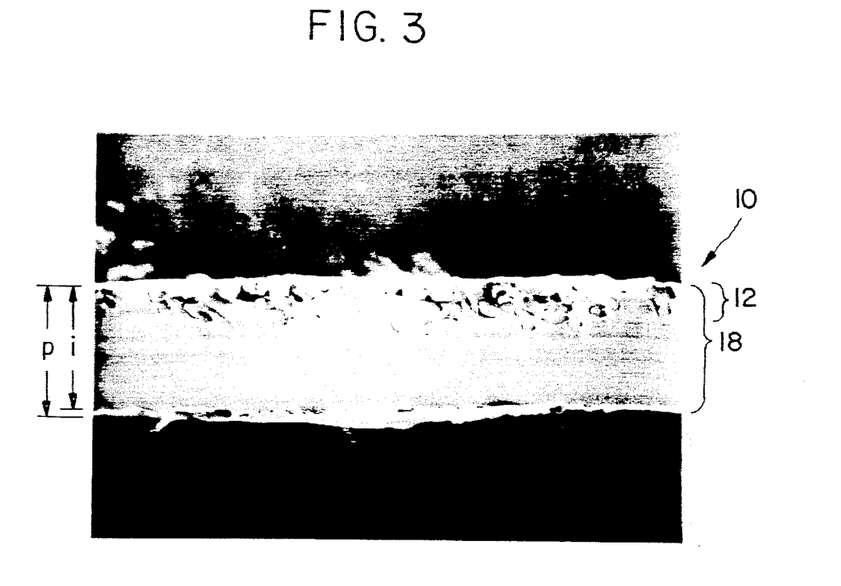
FIG. 3 is a photomicrograph of the composite material illustrated in FIG. 2 prior to being employed in a vacuum thermoforming process.

Referring now first to FIG. 1, illustrated therein is a schematic, front, elevational view of a manufacturing line for producing the embodiment of the composite material 10 of this invention, illustrated in FIGS. 2 and 3, with the machine direction illustrated as right to left.

Nonwoven fabric 12 is introduced from a supply source (not shown) and passed between idle roll 14 and heated roll 16. The nonwoven fabric should be a stabilized web of fibers having, preferably, thermoplastic properties (i.e. the ability to elongate under influence of the heat and stress encountered during a vacuum thermoforming process) so as to be capable of elongation upon the application of heat and tensile forces in order to facilitate conformance with the body to which the finished composite material is to be vacuum thermoformed and adhered to. Preferably, such fibers should have a length which range from about 19 mm to about 50 mm and still more preferably from about 25 mm to about 40 mm. The denier of the fibers may range from about 1 to about 6 and preferably from about 1½ to about 3. The fibers should have an elongation of at least about 10% and preferably, at least about 20% as measured by the method of ASTM D2101-90. Usable fibers include those of nylon, polyester, polyethylene, polypropylene, or even the so-called thermoplastic bicomponent fibers as are described in U.S. Pat. No. 3,381,074.

The web of fibers forming the nonwoven fabric 12 may be laid down by any of several methods taught in the art such as for example, the so-called dual rotor webber described in U.S. Pat. No. 4,018,646, or the transverse webber described in U.S. Pat. No. 4,927,685. Such laid down webs may then be stabilized by various methods already known in the art such as by adhesive or thermoplastic bonding, or by fluid or mechanical entangling or combinations thereof. A preferred stabilized nonwoven fabric is that produced by the methods taught in U.S. Pat. No. 3,485,706, the so-called hydro-entangling or spunlaced process.

The stabilized fabric should range in weight from about 0.5 to about 2 oz/sq. yd. and have a thickness of about 10 to about 20 mils and preferably from about 15 mils to about 18 mils. Within these ranges, the choice of weight and thickness will be chosen to suit a particular purpose; however, to produce a composite material useful for laminating to the insulating materials for vehicles as described herein, it is preferable that the weight ranges between about 1 to about 1.5 oz./sq. yd. and that the thickness range between about 15 to about 18 mils. Adherence to these prescribed ranges will result in a material having the proper impregnation of the fabric prior to the thermoforming process, and being capable of having the impregnating film recede away from the fabric advantageously in the application to vehicle liners. Additives may be employed in the stabilizer fabric such as binder, to more substantially stabilize the fabric, and pigments, to provide the fabric with color. As has been described in the aforementioned prior art, laminates of insulation and cover materials should be color matched for aesthetic reasons.

Referring again to FIG. 1, the fabric 12 is passed around heated roll 16 and is preferably preheated to a temperature of between about 170° F. and about 212° F., and more preferably to about 180° F. to about 190° F. As the fabric 12 is passed around the heated roll 16 and preheated, a film 18 is extruded from a flat film die 20 by means of an extruder 22. The film 18 is deposited onto the preheated fabric 12 at a short distance from the exiting of the flat film die while the polymer is still in the molten state. The choice of thermoplastic polymers or combinations of polymers selected for the film will, of course, vary depending on such factors as the ultimate employment of the composite material, the nature of the fabric with which it is to be combined, the relative thickness of the desired films, the seal temperatures and perhaps the nature of any material onto which the composite material is to be vacuum thermoformed. Such polymers as polyester, polyvinylidene chloride, polyvinyl chloride, polyvinyl acetate, polyethylene or polypropylene are all useful in certain circumstances. Preferably, polymers having melt temperatures in the range of from about 230° F. to about 425° F. are useful.

In the circumstance wherein the composite material is to be sealed to itself, as will be described further herein, minimum seal temperature is also a factor in the selection of a suitable material. In general, such minimum seal temperatures should range between about 250° F. to about 375° F. and preferably from about 275° F. to about 325° F. A Polymer of choice, in particular for use as a composite material for thermoforming onto vehicle liner insulating materials, is linear low density polyethylene film. This Polymer is applied to the fabric at film thickness of from about 3 to about 9 mils and preferably 3 to 7 mils.

Referring again to FIG. 1, the combined film and fabric are next passed into the nip between heated steel roll 16 and a resilient roll 24. The application of heat and Pressure at the nip serves to cause the molten thermoplastic polymer of the film 18 to impregnate the adjacent portions of the nonwoven fabric 12, as is illustrated in FIGS. 2 and 3 and described hereinafter. This impregnation is advantageously carried out in the process exemplified herein by use of the heated steel roll 16 to pre-heat the nonwoven fabric and additionally to maintain a high temperature within the nip. Nip pressure is maintained by use of the resilient roll 24 operating in cooperation with the steel roll 16 to produce nip pressures of between about 20 to about 90 pounds per linear inch. In a preferred embodiment of this invention the temperature of the steel roll 16 is maintained at from about 190° F. to about 205° F., the temperature of the resilient roll 24 is maintained at from about 65° F. to about 75° F. and the nip pressure is maintained at about 40 to about 60 pounds per linear inch. The line speed may range from between 30 to about 300 feet per minute.

It will be understood by one skilled in the art that the Parameters set out herein with respect to temperatures, pressures and line speed may all be controlled so that with a given film and fabric, various degrees of impregnation are attainable and, in the extreme, may result in a fully impregnated fabric or instead, a fabric impregnated only at the interface of the film and the fabric layers. Preferably, for most thermoforming processes, the minimum degree of penetration should be about 25% and, more preferably, about 30%; wherein such percentage is the percent of the total thickness of the fabric impregnated with the film polymer.

The composite material passing from the nip between rolls 16 and 24 next pass around resilient roll 24 and then between roll 24 and a chilled steel roll 26. Chilled roll 26, which may be maintained at temperatures ranging from 45° F. to 90° F., is advantageously employed to accelerate the cooling of the composite material The finished composite material 10 is then passed from the line for storage prior to use.

FIG. 2 illustrates in perspective view a sheet of the finished composite material 10 and FIG. 3 is an actual photomicrograph of an embodiment of the composite material of this invention, taken through a cross section of the material such as line 3—3 in FIG. 2. As is clear from these figures, the fabric 12 forms an outer layer and the film 18 forms an inner layer (these being so referred to so as to denote the positions of the layers when vacuum thermoforming about an article). In the embodiment illustrated, it can be seen that essentially the entire thickness of the composite material comprising fabric 12 is impregnated with film 18 (i.e., the dimension i, the thickness of the impregnated portion, is only slightly smaller than the dimension p, the thickness of the composite). Further, it will be noted that as a result of such impregnation, the film extends essentially throughout the entire thickness of the composite material. On the other hand, the fabric does not extend throughout the thickness of the film and hence the surface of the inner layer is essentially free of fibers. While this particular embodiment is only illustrative and it will be clearly understood that many other variations are possible, advantages flow from this particular relationship of inner and outer layers. Specifically, the composite material presents surfaces which have all the attributes of polymer film prior to use in the vacuum thermoforming process. As such, the composite material remains clean and unwrinkled prior to use, is strong and not subject to tearing, linting or stretching, and can easily be rolled and unrolled owing to the relatively low frictional characteristics of the polymer film. As will be seen, however, after use in a thermoforming process, the outer surface will still manifest the desired fabric-like appearance.

Figure 5:
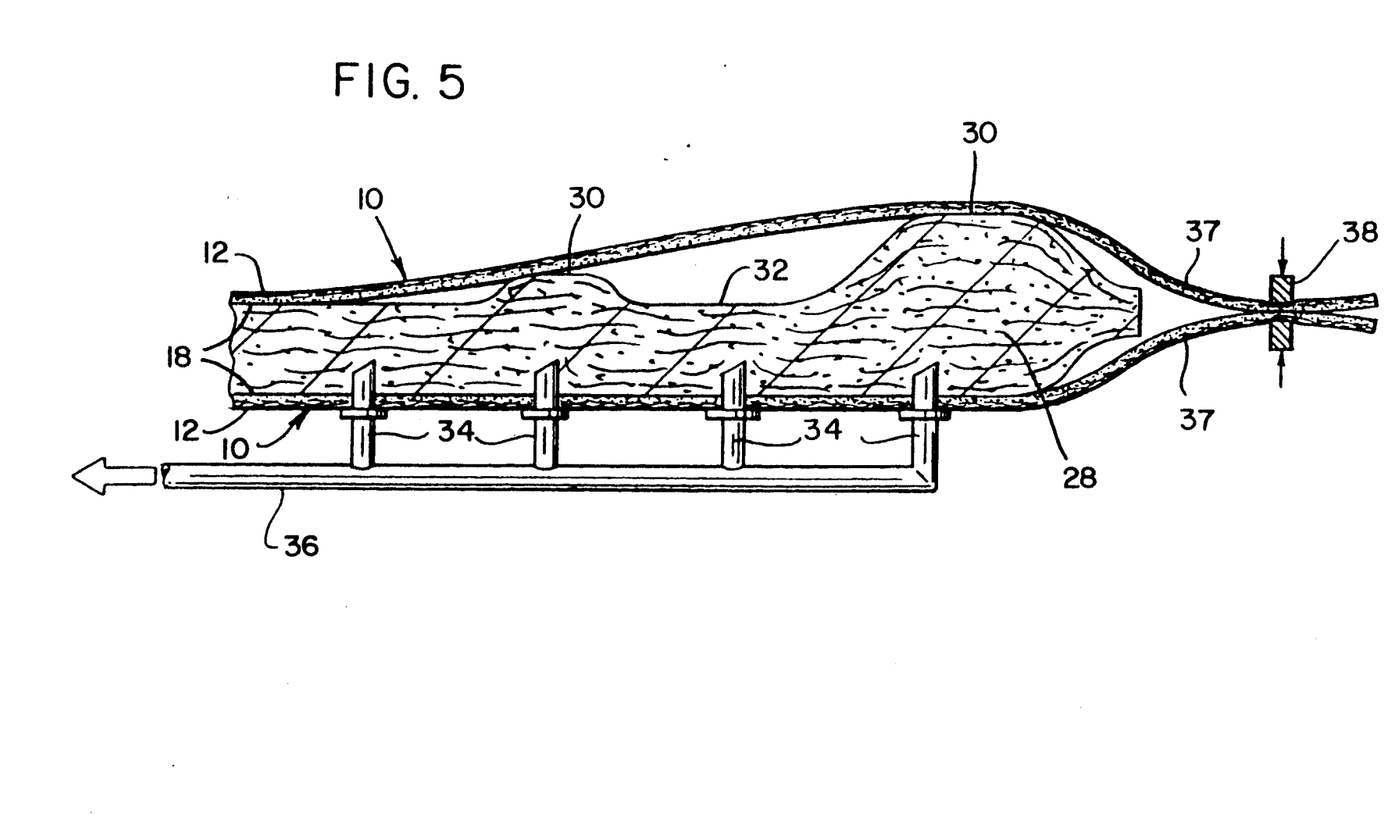
FIG. 5 is a schematic, partial, longitudinal, cross-sectional view of an embodiment of the composite material of this invention in the process of being vacuum thermoformed about a portion of a hoodliner.

Referring now to FIG. 5, illustrated therein is a partial, longitudinal, cross-sectional view of a step in the process of vacuum thermoforming the composite material 10 of this invention about a body which is exemplified in FIG. 5 by a portion of the insulation body 28 of an automobile hood liner. Body 28, is a preformed body having exemplary protrusions 30 and depressions 32 as a result of being formed to conform to the inside of the hood of an automobile. Typically, such a body is made of sound and heat insulating material such as bonded glass fibers and is relatively brittle, rigid, and rough-surfaced. As taught herein, this material is to be encapsulated with the composite material of this invention and vacuum formed about hood liner 28 so as to present a fabric-like aesthetically pleasing outer surface while protecting the body from fiber breakage.

Accordingly, as is illustrated in FIG. 5, the composite material is laid over and under the body 28 with the fabric rich outer layer 12 facing outwardly from the body 28 surfaces and the film rich inner layer 18 facing toward the body 28 surfaces. Preferably, the composite material extends beyond the peripheral portion of the body 28 and such extensions 37 are sealed together by means of a heated seal bar 38 to totally envelop the body 28 in the composite material 10.

Vacuum probes 34 extend into the body 28, through the composite material 10 and are in flow communication with vacuum manifold 36. Means, not shown, are provided for inducing a vacuum through vacuum manifold 36 and vacuum probes 34 so that the pressure within the confines of the composite material enveloped body 28 is lower than the pressure outside such confines. Such means may comprise a vacuum fan or pump such as are well known in the art. Preferably, the lower pressure enclosed within the enveloped body is about 15 inches of mercury vacuum or greater. Means, also not shown, are provided for maintaining the enveloped body at an elevated temperature, e.g. at about 325° F. to about 425° F. and, more preferably, from about 350° F. to about 375° F. The specific selection of temperature is such that, in accordance with the teaching herein, the thermoplastic polymer of the inner layer 18 may be softened and adhered to the surface of the body 28 and the portion of the polymer impregnating the outer layer 12 may be drawn away from the outer surface of layer 12. Means for maintaining such temperature may comprise a heated oven in which the vacuum thermoforming process takes place or other means known to those skilled in the art.

Figure 4:
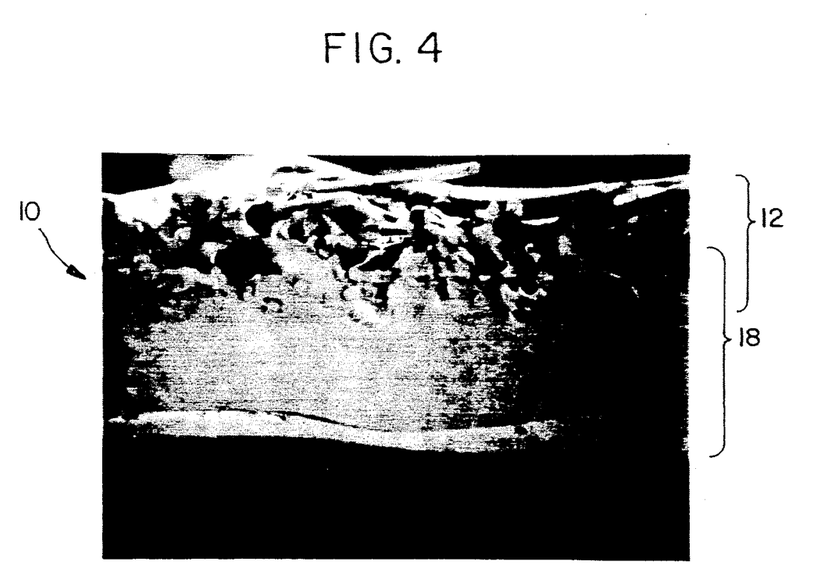
FIG. 4 is a photomicrograph of the composite material illustrated in FIG. 2 after having been subjected to a vacuum thermoforming process.
Figure 6:
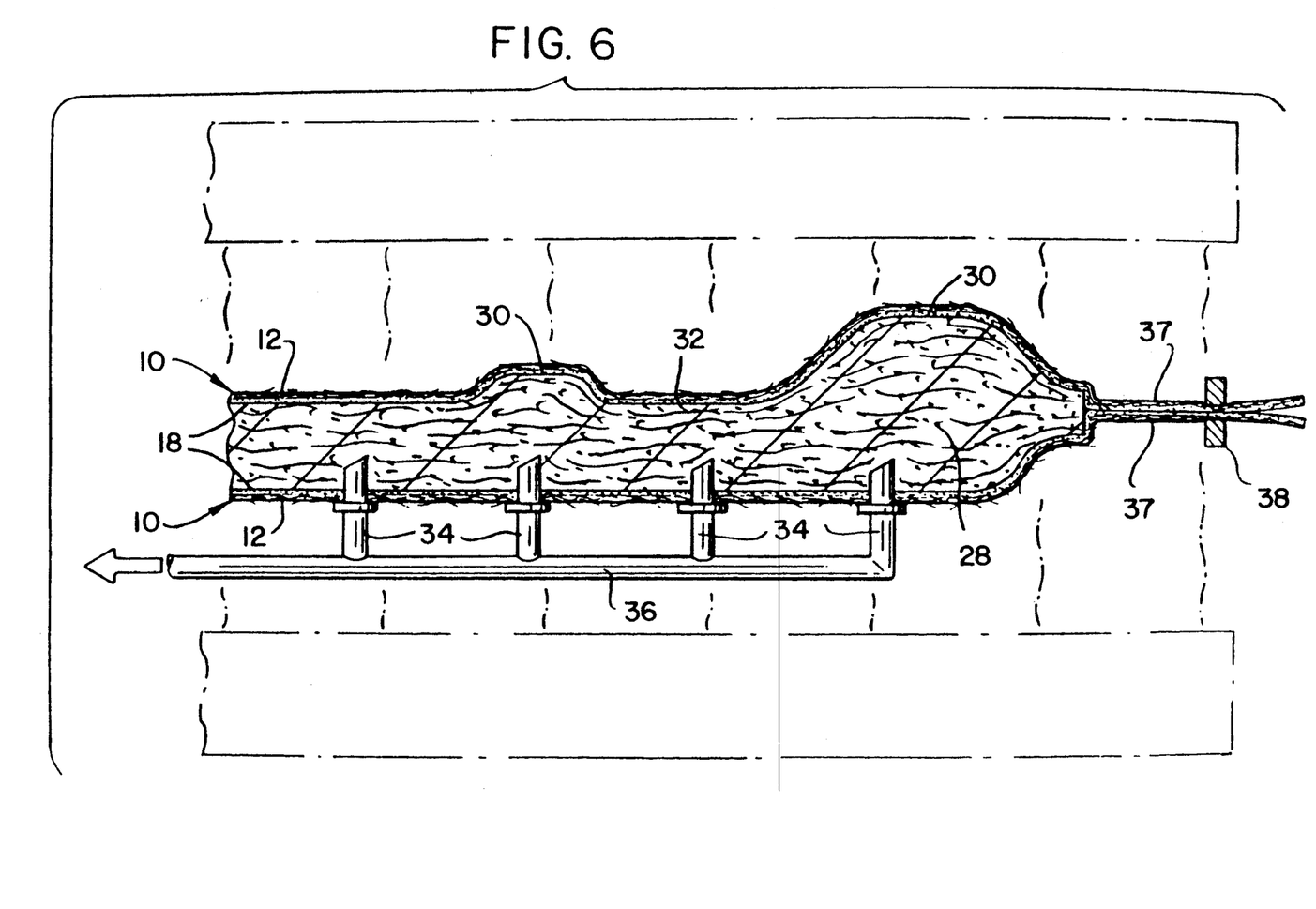
FIG. 6 is a schematic, partial, longitudinal, cross-sectional view of the embodiment of the composite material of this invention in a further step in the process of vacuum thermoforming following that illustrated in FIG. 5.

Referring now to FIG. 6, illustrated therein is the same enveloped body 28 of FIG. 5, after heat and vacuum have been induced. By virtue of such heat and vacuum, composite material 10 has been drawn into contact and conformance with the surfaces of the body 28 and the extensions 37 have been drawn together and adhered to form a tightly encapsulated finished hood liner, having a sealed peripheral flange comprised of extensions 37. The thermoplastic Polymer of inner layer 18 is now adhered firmly to the body 28 and portions of the polymer impregnating outer layer 12 have been drawn toward the inner layer 18 so as to expose the fabric-like surface of outer layer 12. This is best illustrated by reference to FIG. 4 which is a photomicrograph of the same composite material 10 illustrated in FIG. 3 but shown after the composite material 10 has been subjected to a thermoforming process as has been described above. As is clear from this FIG. 3, the polymeric material impregnating outer layer 12 has been drawn away from the surface of outer layer 12, thus exposing the fabric-like surface.

EXAMPLES

A series of materials are made for comparative and exemplary purposes. In the following description taken in conjunction with the table below, these materials are described in terms of the fabric parameters, film parameters, the process parameters for making them.

TABLE

| | | | Comparative Example | | | | | |
|---|---|---|---|---|---|---|---|---|
| | Example 1 | Example 2 | Example 3 | Example 4 | Example 5 | Example 6 | Example 7 | Example 8 |
| Fabric parameters | | | | | | | | |
| Fiber type | Fortrel 310 polyester | N/A | Fortrel 310 polyester | Fortrel 405/ BASF 81-72 40% polyester/ 60% rayon blend Polyester fibers  Rayon fibers | Fortrel 310 polyester | Fortrel 472 polyester | Fortrel 405 polyester | Trevira 181 polyester |

TABLE-continued

|  | Example 1 | Example 2 | Comparative Example Example 3 | Example 4 | | Example 5 | Example 6 | Example 7 | Example 8 |
| --- | --- | --- | --- | --- | --- | --- | --- | --- | --- |
| Fiber length (mm) | 38 | N/A | 38 | 38 | 32 | 38 | 38 | 38 | 38 |
| Fiber denier | 1.5 | N/A | 1.5 | 2.25 | 2.45 | 1.5 | 1.5 | 2.25 | 1.5 |
| Fiber tenacity (g/den) | 6.2 | N/A | 6.2 | 3.3 | 1.5 | 6.2 | 4.4 | 3.3 | 6.2 |
| Fiber elongation (%) | 26 | N/A | 26 | 40 | 20 | 26 | 52 | 40 | 24 |
| Fabric thickness (mils) | 17 | N/A | 17 | 15 | | 17 | 15 | 15 | 16 |
| Fabric weight (oz/sq yd) | 1 | N/A | 1 | 1 | | 1 | 1 | 1 | 1 |
| Entangling energy (hp-hr/lb) | 1.2 | N/A | 1.2 | 1.2 | | 1.2 | 1.2 | 1.2 | 1.2 |
| Film Parameters |  |  |  |  |  |  |  |  |  |
| Polymer | N/A | LLDPE[(1)] | LLDPE[(1)] | LLDPE[(1)] | | LLDPE[(1)] | LLDPE[(1)] | LLDPE[(1)] | LLDPE[(1)] |
| Thickness (mils) | N/A | 3 | 3 | 3 | | 3 | 7 | 3 | 3 |
| Process Parameters |  |  |  |  |  |  |  |  |  |
| Polymer temp. (°F.) | N/A | N/A | N/A | 510 | | 510 | 510 | 510 | 510 |
| Heated roll temp. (°F.) | N/A | N/A | 325 | 190 | | 190 | 190 | 190 | 190 |
| Resilient roll temp. (°F.) | N/A | N/A | 65 | 65 | | 65 | 65 | 65 | 65 |
| Chill roll temp. (°F.) | N/A | N/A | 45 | 45 | | 45 | 45 | 45 | 45 |
| Nip press. (lb/in in) | N/A | N/A | 6 | 50 | | 50 | 50 | 50 | 50 |
| Line speed (ft/min) | N/A | N/A | 30 | 30 | | 30 | 30 | 30 | 30 |
| Penetration (%) | N/A | N/A | 30 | 60 | | 50 | 46 | — | — |
| Results |  |  |  |  |  |  |  |  |  |
| Taber abrasions (cycles) | 26 | 275 | 1058 | 6500 | | 6500 | 10000 | 6500 | 6500 |
| Spencer impact (gm/mil) | — | 283 | 220 | 1600 | | 1600 | 1600 | 1600 | 1600 |
| Mullen burst (psi) | 25 | 20 | 44 | — | | 54 | 68 | — | — |
| Vacuum formability | N/A | S | U | U | | S | S | S | S |
| Heat sealability | N/A | S | S | S | | S | S | S | S |
| Aesthetics | N/A | U | U | S | | S | S | S | S |

[(1)]Low density linear polyethylene, melt index 5.4–6.6, melt temperature 240° F.

Additionally, the results obtained when using these materials in a vacuum thermoforming process is set out in the table and described below. In the above table it should be noted that FORTREL is a trademark of Fiber Industries Inc. for polyester fibers and TREVIRA is a trademark of Hoechst Celanese Corporation for polyester fibers. The fiber tenacity and the fiber elongation are determined by the method of ASTM D 2101-90. The fabric thickness is determined by ASTM D 1777-64 using a 2 ounce weight on a 1- inch diameter foot. The film thickness is determined by ASTM D 1777-64 using a 1 ounce weight on a 1⅛ inch diameter foot. In the process parameter column, the term "entangling energy", in horsepower hours per foot, is that employed in the above referenced hydroentangling process of U.S. Pat. No. 3,485,706, incorporated herein by reference. All fabrics are made by forming a stabilized web according to the teachings of the U.S. Pat. No. 3,485,706 using as a forming member a 103 by 78 polyester monofilament belt in a 3-shed weave pattern wherein the warp filaments are 0.15 mm in diameter and the shute filaments are 0.020 mm in diameter. The belt has an open area of 15.1% and was supplied by Appleton Wire Works of Appleton, Wis. The stabilized web was then further stabilized with an acrylic latex binder at a finished fabric add on of 10.2% by weight of the binder free web.

The Taber abrasions referred to in the table are determined by ASTM D 3884-80, using a Tabor model 503 abrasor from the Teledyne Taber Company of North Tonawanda, N.Y. and employing CS-0 rubber wheels with a 1,000 gram load thereon. The Spencer impact referred to is determined by ASTM D 3420-85. The Mullen burst is determined by TAPPI T403 m-85.

The vacuum formability is the subjective observation of the material in question after subjected to a vacuum thermoforming process such as is described herein operating at a temperature of 335° F. and a vacuum of 22 inches of mercury. Generally, satisfactory formability (designated as "S" in the table) is when the resultant encapsulating material conforms to the encapsulated body and maintains such position Unsatisfactory formability (designated as "U" in the table) is when the product separates or when the material separates or fails to conform in whole or in part to the body or forms bubbles or blisters. Heat sealability refers to the ability in the material to seal to itself under the influence of heat and pressure such as the sealing bar referred to in FIG. 6. Aesthetics refers to the appearance and feel of the finished vacuum formed encapsulated body wherein aesthetically pleasing fabric-like surfaces which do not lint or form particles is preferable.

In considering the comparative examples 1–4 of the above table, Example 1 illustrates the use of a fabric alone and while it is clear that such material is unusable for the purposes of vacuum thermoforming, the data is provided to illustrate the Taber Abrasion values which are extremely low. Example 2 illustrates the use of an all thermoplastic film material and, as expected, heat sealability and vacuum formability are excellent but the aesthetic properties are certainly unsatisfactory based on the above-described criteria It should be noted that the Taber abrasion is substantially higher than for the fabric of Example 1.

Example 3 is provided to describe a composite material which contrary to the teachings of this invention does not provide for significant impregnating polymer. Instead, this material has been made by laminating a preformed film onto a fabric and passing that combined material through the nip formed between a resilient and a heated roll at nip pressures of only 6 pounds per linear inch and at temperatures of 325° F. The result is a laminated product with insufficient polymer penetration. As can be seen from this Example, the combined materials exhibit a substantially higher Taber abrasion then either of the film or fabric alone. In considering vacuum formability, however, many portions of the encapsulated body remained unadhered to this fabric and instead bubbles and other failure to conform were noted. With respect to aesthetics it was found that the material tended to delaminate; both the film from the fabric and the composite from the encapsulated body.

Example 4 illustrates a composite material wherein the fabric comprises a substantially high proportion of nonthermoplastic fibers, i.e., rayon fibers. This material produced unsatisfactory vacuum formability in that it failed to conform to the enveloped body. Accordingly, it is preferred that the fabric consist essentially of thermoplastic fiber and that only that quality of nonthermoplastic fiber which still allow for conformability be included. Most preferably, the fabric is all thermoplastic fiber, and less preferably, contains no more than fifty percent (50%) nonthermoplastic fibers. Examples 5, 6, 7 and 8 all illustrate the production and performance of composite materials made in accordance with the teachings of this invention. Example 5 represents the use of material wherein the percent elongation of fibers is relatively low whereas, Example 6 illustrates a relatively high percent elongation. Example 6 illustrates the use of a particularly thick film as contrasted with the other examples which use a relatively thinner film.

Example 7 employs fibers of essentially intermediate fiber elongation and Example 8 illustrates fibers obtained from another source and is in other respects similar to that of Example 5. In all cases it will be noted that the vacuum formability was completely satisfactory with good performance and good adherence to the encapsulated body. Heat sealability was entirely satisfactory and aesthetics were likewise totally satisfactory. It should be noted that the use of the thicker film resulted in substantially higher Taber abrasion values and in all cases the Spencer impact value was greatly increased.

What is claimed is:

1. A composite material for use in a vacuum thermoforming process comprising:
   an outer layer of nonwoven fabric consisting essentially of thermoplastic fibers capable of elongation upon the application of heat and tensile force; and
   an inner layer of thermoplastic film; a portion of said film impregnating the fabric and a portion of said film not impregnating the fabric; said film being impregnated into the fabric at an interface between the layers to the degree that the combined thickness of the nonimpregnating portion of the film and the impregnated portion of the fabric is greater than the thickness of the portion of the fabric not impregnated with said film;
   whereby, when said composite material is subjected to a thermoforming process, the impregnating film will be drawn toward the inner layer, exposing fibers of the outer layer.

2. The composite material of claim 1 wherein the fibers have a length of from 19 to about 50 millimeters.

3. The composite material of claim 1 wherein the fibers have a denier of from about 1 to about 6.

4. The composite material of claim 1 wherein said fibers have an elongation of at least 20.

5. The composite material of claim 1 wherein said fabric has a weight of about 0.5 to about 2 ounces per square yard.

6. The composite material of claim 1 wherein the fabric has a thickness of from about 10 to about 20 mils.

7. The composite material of claim 1 wherein the thermoplastic film has a melt temperature of from about 230° F. to about 425° F.

8. The composite material of claim 1 wherein the film has a minimum seal temperature of from about 250° F. to about 375° F.

9. The composite material of claim 1 wherein the film has a thickness of about 3 to about 9 mils.

10. The composite material of claim 1 wherein said fabric comprises fibers of polyester and said film comprises polyethylene polymer.

11. A method of making a composite material for use in a vacuum thermoforming process comprising:
    providing an outer layer of nonwoven fabric consisting essentially of thermoplastic fibers capable of elongation upon the application of heat and tensile force;
    providing an inner layer of film comprising thermoplastic polymer in face-to-face relationship with said outer layer;
    subjecting said layers to heat and pressure to impregnate a portion of said polymer into the fabric while leaving the remaining portion nonimpregnating;
    said polymer being impregnated into the fabric at the interface between the layers to the degree that the combined thickness of the nonimpregnating portion of the film and the impregnated portion of the fabric is greater then the thickness of the portion of the fabric not impregnated;
    whereby, when said composite material is subjected to a thermoforming process, the impregnating polymer will be drawn toward the inner layer exposing fibers of the outer layer.

12. The method of claim 11 wherein said film is extruded onto said fabric prior to the impregnation step.

13. The method of claim 12 wherein the fabric is preheated prior to the impregnation step.

14. The method of claim 11 wherein the impregnation step is carried out by passing the film in face-to-face relationship with the fabric through the nip of two rolls at least one of which is heated.

15. The method of claim 14 wherein said heated roll is heated to a temperature of about 190° F. to 205° F.

16. The method of claim 15 wherein said heated roll is heated to a temperature of about 190° F. to about 205° F. and the second roll is maintained at a temperature of about 65° F. to about 75° F.

17. The method of claim 14 wherein the nip pressure applied is from about 30 to about 40 pounds per linear inch.

18. The method of claim 14 wherein said composite material moves at a line speed of about 30 to about 300 feet per minute through said nip.

19. The method of claim 16 wherein the material leaving the impregnation step passes through the nip formed between said other roll and a chilled roll.

20. The method of claim 19 wherein the chilled roll is maintained at a temperature of from about 45° F. to about 90° F.

21. A method for forming an encapsulated body comprising:
    providing a composite material comprising an outer layer of nonwoven fabric consisting essentially of thermoplastic fibers capable of elongation upon the application of heat and tensile force and an inner layer of thermoplastic film, a portion of said film impregnating the fabric and a portion of said film not impregnating the fabric, said film being impregnated into the fabric at an interface between the layers to the degree that the combined thickness of the nonimpregnating portion of the film and the impregnated portion of the fabric is greater than the thickness of the portion of the fabric not impregnated with said film;

enveloping said body in said composite material with said inner layer facing said enveloped body and said outer layer facing outward of said enveloped body;

applying heat and inducing a lower pressure within said enveloped body then without said enveloped body to draw said composite into close contact and conformance with said body and to adhere said thermoplastic polymer to said body while also drawing a portion of said impregnating polymer toward said body thereby exposing impregnated fibers in said outer layer.

22. The method of claim 21 wherein the temperature at which heat is applied is from about 325° F. to about 425° F.

23. The method of claim 22 wherein the heat is applied at a temperature of about 350° F. to about 375° F.

24. The method of claim 21 wherein the lower pressure induced within the enveloped body is greater than 15 inches of mercury vacuum.

25. The method of claim 21 wherein the encapsulated body is maintained under the heated and induced lower pressure state for a period of at least from about 4 to about 14 seconds.

* * * * *

UNITED STATES PATENT AND TRADEMARK OFFICE
CERTIFICATE OF CORRECTION

PATENT NO. : 5,164,254
DATED : November 17, 1992
INVENTOR(S) : Todd et al.

It is certified that error appears in the above-identified patent and that said Letters Patent is hereby corrected as shown below:

On the title page, item (75), Inventors:

"Doishuk" should be --Doroshuk--

Column 9:

Claim 4, Line 63

"20" should be --20%--

Column 10:

Claim 11, Line 28

"then" should be --than--

Signed and Sealed this

Ninth Day of November, 1993

Attest:

BRUCE LEHMAN

Attesting Officer

Commissioner of Patents and Trademarks